United States Patent
Gaia et al.

(10) Patent No.: US 10,059,893 B2
(45) Date of Patent: Aug. 28, 2018

(54) METHOD FOR GASIFYING A BIOMASS AND RESPECTIVE GASIFIER

(71) Applicant: TURBODEN S.r.l., Brescia (BS) (IT)

(72) Inventors: Mario Gaia, Brescia (IT); Roberto Bini, Brescia (IT)

(73) Assignee: TURBODEN S.R.L., Brescia (BS) (IT)

(*) Notice: Subject to any disclaimer, the term of this patent is extended or adjusted under 35 U.S.C. 154(b) by 86 days.

(21) Appl. No.: 15/101,652

(22) PCT Filed: Jan. 13, 2015

(86) PCT No.: PCT/IB2015/050238
§ 371 (c)(1),
(2) Date: Jun. 3, 2016

(87) PCT Pub. No.: WO2015/107450
PCT Pub. Date: Jul. 23, 2015

(65) Prior Publication Data
US 2016/0304797 A1 Oct. 20, 2016

(30) Foreign Application Priority Data
Jan. 16, 2014 (IT) .............. BS2014A0018

(51) Int. Cl.
*C10J 3/02* (2006.01)
*C10J 3/72* (2006.01)
(Continued)

(52) U.S. Cl.
CPC . *C10J 3/02* (2013.01); *C10J 3/20* (2013.01); *C10J 3/721* (2013.01); *F01D 15/10* (2013.01); *F02B 63/04* (2013.01); *F02B 65/00* (2013.01); *F02C 3/28* (2013.01); *C10J 2200/156* (2013.01); *C10J 2300/0916* (2013.01); *C10J 2300/0956* (2013.01); *C10J 2300/1223* (2013.01); *C10J 2300/1653* (2013.01); *F05D 2220/32* (2013.01); *Y02E 20/16* (2013.01); *Y02E 20/18* (2013.01); *Y02P 20/145* (2015.11)

(58) Field of Classification Search
CPC combination set(s) only.
See application file for complete search history.

(56) References Cited

U.S. PATENT DOCUMENTS

| 5,089,030 A | 2/1992 | Michel-Kim |
| 5,177,953 A * | 1/1993 | Firey .................. C10J 3/04 60/39.12 |

(Continued)

FOREIGN PATENT DOCUMENTS

| DE | 10258640 A1 | 6/2004 |
| WO | 2005/047435 A2 | 5/2005 |

(Continued)

*Primary Examiner* — Kaity Chandler
(74) *Attorney, Agent, or Firm* — Volpe and Koenig, P.C.

(57) ABSTRACT

A method for producing syngas from preferably vegetal biomass is described. The method provides for the use of a fixed bed gasifier, equipped with two reactors. The biomass is fed to both reactors together with a primary flow rate of air. Advantageously, the method according to the present invention is different from the known art since a secondary flow rate of air is withdrawn from the first reactor at the area where the biomass dries, and fed to the second reactor at the area where the biomass dries, and vice versa, alternately during time. Alternatively, an oscillating air flow is created in each reactor. The achievable result is a greater syngas production, but not exclusively. The syngas quality is improved too, since the biomass has a longer time for completing the gasification reactions.

17 Claims, 8 Drawing Sheets

(51) Int. Cl.
*F01D 15/10* (2006.01)
*F02B 65/00* (2006.01)
*F02B 63/04* (2006.01)
*C10J 3/20* (2006.01)
*F02C 3/28* (2006.01)

(56) References Cited

U.S. PATENT DOCUMENTS

| | | | | |
|---|---|---|---|---|
| 5,231,821 A | * | 8/1993 | Firey | C10J 3/04 60/39.12 |
| 5,417,183 A | * | 5/1995 | Firey | F02B 45/02 123/3 |
| 5,479,893 A | * | 1/1996 | Firey | F02B 45/02 123/23 |
| 6,112,677 A | | 9/2000 | Kuntschar et al. | |
| 7,942,943 B2 | | 5/2011 | Theegala | |
| 2012/0238645 A1 | * | 9/2012 | Rudlinger | C10G 2/30 518/700 |
| 2014/0151191 A1 | * | 6/2014 | Stevenson | B65G 53/48 198/572 |

FOREIGN PATENT DOCUMENTS

| | | |
|---|---|---|
| WO | 2005/113732 A1 | 12/2005 |
| WO | 2008/107727 A2 | 9/2008 |

* cited by examiner

METHOD FOR GASIFYING A BIOMASS AND RESPECTIVE GASIFIER

FIELD OF THE INVENTION

The present invention refers to a method for producing fuel gas by using biomass of vegetal origin, and to a gasifier and a plant using such a method.

STATE OF THE ART

The production of fuel gas from vegetal biomass is possible thanks to gasifiers, apparatuses using the pyrolysis—a phenomenon based on the splitting of long chain molecules combined with a pool of so-called gasifying reactions—in order to convert the organic materials of biomass in gases, by heating them with a presence of little oxygen amounts. Pyrolysis and subsequent gasifying reactions happen at high temperatures, mostly comprised in the range 300-900° C., in presence of a sub-stoichiometric percentage of an oxidizing aeriform fluid, typically air, oxygen and/or steam. The resulting gaseous mixture, usually defined syngas, is a fuel gas.

More in detail, in a gasifier the biomass is subjected to at least the following processes:

i) during the pyrolysis process, aeriform compounds are released such as hydrogen and methane, CO, $CO_2$, and a carbonization is obtained, which becomes a carbonaceous biomass called CHAR. A considerable percent of tar is produced too;

ii) an exothermic oxidation process verifies, since volatile products and parts of char react with the oxygen fed to the gasifier, thereby producing carbon-dioxide and -monoxide and generating heat, the latter being in turn necessary to sustain the subsequent gasification reactions;

iii) the gasification happens when the char resulting from pyrolysis reacts with carbon dioxide and water vapor or oxygen, producing carbon monoxide and hydrogen following the transformations $$C+CO_2 \rightarrow 2CO$$

$$2C+O2 \rightarrow 2CO$$

$$2C+O2 \rightarrow C+CO_2$$

$$C+H_2O \rightarrow CO+H_2$$

and various other reactions constituting the gasification process;

iv) in its turn the carbon monoxide reacts with the water vapor producing an equilibrium reaction called water-gas-shift reaction:

$$CO+H_2O \leftrightarrows CO_2+H_2.$$

In practice, after the initial pyrolysis, a small amount of oxygen is introduced in the reactor, so that part of the organic material burns and produces carbon monoxide with thermal power useful for the subsequent reaction converting additional organic material into hydrogen and additional carbon monoxide.

In the last years gasifiers have been proposed, which can be fed with vegetal biomass such as wood, for example waste from forest pruning, or olive residues, paper, straw, etc.

At the moment at the three classes of main gasifiers are known: fluidized bed gasifiers, fixed bed gasifiers, herein considered, and entrained bed gasifiers (useful for large power).

In their turn, the fixed bed gasifiers can be down-draft gasifiers or up-draft gasifiers. In both cases, the gasifiers comprise a vertical reactor. Inside the reactor there is a mass, just called "bed", formed by the biomass, the char produced by the biomass pyrolysis and ashes.

In up-draft fixed bed gasifiers the biomass is loaded in the upper part of the reactor. Then it reacts with a gasifying flow (air and/or oxygen, vapor) going up from the bottom part of the reactor, just counter-current with respect the feeding direction of the biomass. The biomass undergoes a pyrolysis process transforming in a solid biomass of carbonaceous material, exactly the char, proceeding downwardly. In the carbonaceous mass the pool of gasification reactions occurs until the carbon mass is reduced to a modest residual combined with ashes, inert materials, etc. The ashes are removed from the bottom of the reactor, pulverulent or in the form of slag. The produced gas, rich in tar and heavily loaded with dust, needs purification before use. This type of gasifiers accepts relatively non-uniform biomass with a high moisture level better than others. On the other hand, the obtainable syngas is full of moisture, tar and particulate.

In down-draft fixed bed gasifiers, the gasifying flow is fed in the reactor from top, in the same direction as biomass. In order that the gasifier operates, the upper part of the bed can be heated simply by conduction from the high-temperature reaction areas, by burning little amounts of fuel, or by using an external heat source. The produced tar must pass through a char bed at high temperature, and then the produced syngas is cleaner than that obtained in up-draft gasifiers, other conditions unchanged. In addition, the moisture content is lower too. On the other hand, the gasifier accepts only biomass having optimal uniformity features, little sizes and low initial moisture content.

WO 2005/047435, U.S. Pat. No. 7,942,943, U.S. Pat. No. 6,112,677 and WO 2005/113732 describe solutions according to the known art.

Document WO 2008/107727 describes a biomass gasifier in which three areas or stages can be identified: a first stage in which the pyrolysis occurs, a second stage in which the combustion is provided and a third stage in which the syngas formation is provided. Differently from other conventional solutions, in which the three stages are consecutive and adjacent to a single reactor, here the stages are arranged in a different way. In particular, the first stage is maintained separated from the second and the third stage (these latter stages are adjacent and consecutive) for the interposition of a "buffer" area. For this reason in the description at page 4 line 30, and page 5 line 32, it is referred to a first stage as an up-draft fixed bed reactor, and to a third stage as a down-draft fixed bed reactor. The two reactors are contained in the same casing, and they are not completely different one from another as the air flows fed to the reactors are preheated (in convenient heat exchangers) by a gas flow withdrawn from the outlet of the third stage. In normal use conditions, the gasifier operates as shown in FIG. 1. Only in unusual conditions, when the biomass fed to the gasifier is particularly moist, the gasifier operation is changed as shown in FIG. 2, i.e. by suppressing the air flow 14 and generating the air flow 22 towards the first stage. The reversal of air flows fed to the gasifier is described relating to an emergency condition (page 7, lines 27-28). In any case, it is an operation with substantially permanent flows.

The present invention concerns a fixed bed gasifier.

OBJECT AND SUMMARY OF THE INVENTION

It is an object of the present invention to provide a method for gasifying biomass with a fixed bed gasifier and the respective gasifier, which allow obtaining, with respect to known solutions, a greater production of syngas for volume unit of the gasifier, a better quality of syngas and a higher tolerance of the gasifier to non-uniform biomasses.

Therefore, in its first aspect the present invention relates to a method according to claim 1 for producing syngas from biomass, preferably of vegetal origin.

In particular, the method comprises the steps of:

a) arranging a gasifier provided with at least one first reactor and at least one second reactor, for example vertical vessels in which the biomass is dried, caused to the carbonize by means of pyrolysis and char subject to gasification;

b) in each reactor, feeding biomass and a primary flow rate of oxidizing aeriform fluid, for example air, co-current or counter-current with respect to the biomass, to the extent of obtaining a fixed bed of drying biomass, biomass subjected to pyrolysis and char releasing the syngas. In alternative, the primary flow rate of oxidizing aeriform fluid can be fed in a chamber fluidically connecting the two reactors, according to an arrangement not defined as co-current or counter-current. As a further alternative, the primary flow rate of aeriform fluid can be fed partially into the reactors and partially into the connecting chamber. Advantageously, the method according the present invention is different from the known art since it provides for the following steps alternated in time, which aid the syngas production:

c) suctioning a secondary flow rate of oxidizing aeriform fluid from the first reactor, preferably at the area where the biomass dries, and feeding it to the second reactor, preferably at the area where the biomass dries, and d) suctioning a secondary flow rate of oxidizing aeriform fluid from the second reactor, preferably at the area where the biomass dries, and feeding it to the first reactor, preferably at the area where the biomass dries.

As an alternative to steps c) and d), the method provides for the steps, alternated in time, of, e) increasing the volume of the first reactor to expand a volume of oxidizing aeriform fluid at the area where the biomass dries and, at the same time, decreasing the volume of the second reactor to compress a corresponding volume of oxidizing aeriform fluid at the area where the biomass dries, and e) increasing the volume of the second reactor to expand a volume of oxidizing aeriform fluid at the area where the biomass dries and, at the same time, decreasing the volume of the first reactor to compress a corresponding volume of oxidizing aeriform fluid at the area where the biomass dries.

De facto in steps c) and d), a transfer of the secondary flow rate of aeriform fluid is alternately provided between the reactors. On the contrary, in steps e) and f), there is not a transfer of oxidizing aeriform fluid, but in each reactor a substantially alternating flow is created, i.e. a predefined volume of oxidizing aeriform fluid, already present in the reactor, contracts and expands.

From now on, for simplicity it will be referred to the case in which the oxidizing aeriform fluid is air. The field technician will anyway comprise that, as an alternative, oxygen, CO, $CO_2$, water vapor, etc., and mixtures thereof can be used, as well as every aeriform fluid able to cause gasification reactions with the solid biomasses and the char derived therefrom.

In claim 1, it is specified that the primary flow rate can be co-current or counter-current, and/or put into the connecting chamber of the reactors. In practice, this feature must be intended with the meaning that the primary flow rate can be:

co-current, and in this case it is put into reactors in the same direction of the biomass, i.e. from bottom or top, and it moves with the same direction of the biomass, from the drying area to the gasification area, or else counter-current, and in this case the primary flow rate of air is fed downwards the gasification area and in a direction opposite to the moving direction of the biomass, or, alternatively, the primary flow rate of air is put into the connecting chamber of the reactors, for example a chamber in which the two reactors are tightly connected and in which the air is injected by using a torch or a burner generating a flame of oxidizing agent in a reducing environment. Still according to another alternative, part of the primary flow rate of air is put into the reactors and part into the connecting chamber.

De facto, when the secondary flow rate of air is withdrawn from a reactor, this is forced to counter-current cross the fixed bed of that reactor, in a direction opposite with respect to the moving direction of the biomass. As the steps c) and d) are alternated during time, this happens only for a limited period of time, after that the secondary flow rate of air is withdrawn from the other reactor and put again, in a co-current way, into this reactor.

Similarly, in steps e) and f) an air volume is compressed and expands consecutively in each reactor during time, thereby forcing a corresponding flow to cross back and forth the fixed bed, with reciprocating motion.

The "bellows" effect the carrying out of steps c)-d) and e)-f) creates in the bed, allows the pyrolysis of the dried biomass to be optimized. In the area of the fixed bed in which the syngas production carries out, the biomass char reacts with the volatile substances generated by pyrolysis and with the air (oxidizing agent) crossing the reactor reciprocatingly. This section at high temperature becomes larger than what could be found in the reactor of a conventional gasifier, other conditions unchanged. For the same reasons, the section of the fixed bed in which the pyrolysis carries out will reduce its size with respect to what could be found in the reactor of a conventional gasifier, other conditions unchanged.

The achievable result is a greater syngas production, but not exclusively. Also the syngas quality is improved as the contact time, and most of all the contact effectiveness, between the char and the reacting gases, is increased.

Among other things, thanks to the implementation of the method according to the present invention, the reactors can be higher than the nowadays conventionally used reactors. As a matter of fact, the withdrawal and the alternating inflow of the secondary flow rate of air allow transferring effectively the heat along the axes of the reactors and extending the pyrolysis and gasification processes and, then, they allow processing a greater biomass amount in the time unit.

In other words, the method is based on the following conception: the permanent gas flow typically crossing one or more biomass layers in the gasifier, where known transformations of drying, pyrolysis, gasification, in case of exothermic oxidation are carried out, is here aided by a gas flow with a "back and forth" motion through the affected layer. Therefore, the gas flow in the gasifier can be seen as the sum of two motions, one periodically variable during time with a substantially alternating development, the other one permanent. This second permanent motion causes the transportation of aeriform components (gases and vapors) out of the considered layer, which carry out the transformations occurring in the same layer.

In the following, the two motions will be named as "alternating" or "reciprocating" and "of transportation".

The resulting gas flow, i.e. alternating and overlapping to the permanent one, could establish in every gasifier layer. The gas motion can be forced by one or more fans, and in each layer the gas flow rates can be provided by the adjacent layers and/or specific ducts separated from the adjacent layers. A reciprocating motion in specific layers has been used in the past in various gasifiers, however the specificity of the proposed method lies in the overlapping of a substantially reciprocating periodic motion, i.e. having a null mean value, over a transportation motion.

The overlapping of a reciprocating motion of gas corresponds to an increase of the transport capacity of thermal power of gas inside the layer and an increase of the capacity of heat and mass exchange among solid elements of the crossed bed and the moving gas. Therefore, there is an effective activation of transformations due to interaction between solid and aeriform materials.

Furthermore, the speed and the frequency of reciprocating motion are independent variables, which can be imposed and controlled depending on particular purposes.

In particular, an extension of the high temperature region of the char bed can be obtained, independently from the transport flow rate. As a matter of fact it is possible, in presence of a little transport flow rate (to which a little production of gas exiting from the gasifier is associated with) thanks to the reciprocating motion, to maintain a great char mass at high temperature.

This great mass is ready to produce gas, coping with very quick load changes.

This possibility can become so extreme as the possibility, for the gas user, of switching very rapidly from an idle position to a full power position, skill well adapted for the use of gas in rapidly adjustable primary engines, such as gas engines or gas turbines.

The above described general method can be realized through the more specific method hereinafter described.

Preferably, the steps c) and d), and the steps e) and f), are time-consecutive, or a pause is provided among the same. A frequency suitable for the alternation of steps c) and d) is comprised between 0.01 Hz and 10 Hz, referring to the whole cycle.

Steps c) and d), and e) and f), are carried out alternately during the implementation of step b), i.e. whereas the reactors are fed by the primary flow rate of air and biomass.

Preferably, steps c) and d) are carried out by means of one or more fans.

Preferably, the mean of the absolute value of the secondary flow rate is equal to a percentage of the primary flow rate, still in absolute value, comprised between 10% and 300% by mass.

Preferably, the steps e) and f) are carried out by means of a plunger alternately moving in a duct extending between the reactors and opening at the respective areas where the biomass dries. Alternatively, each reactor comprises a bellows-like portion; two bellows are alternately activated, one in compression and the other one in expansion, to compress and expand alternately the same air volume in reactors and create a bellows effect.

In an alternative embodiment, the gasifier comprises more than two reactors, for example four or six reactors, modularly connected in series and/or in parallel referring to suction and feed of primary flow rate and secondary flow rate of oxidizing aeriform fluid, also with additional inflow ducts of oxidizing aeriform fluid, if necessary. The modularity allows setting and modifying the gasifier size easily, also in times successive to the initial implementation, depending on the power required for the plant using the syngas.

In its second aspect the present invention relates to a down-draft fixed bed gasifier according to the claim 10.

The gasifier comprises a first reactor and a second reactor, preferably vertical vats, and means for feeding biomass in each reactor, for example feeding ducts provided with convenient shut-off valves.

In each reactor, at different heights, the biomass is subjected to drying, pyrolysis and gasification. The system formed by the drying biomass, the biomass subjected to pyrolysis and the biomass char subjected to gasification, is called a fixed bed.

Convenient inflow lines feed a primary flow rate of an oxidizing aeriform fluid, for example air, in each reactor, preferably co-current with respect to the biomass, or counter-current, and/or also according to a solution providing the intermediate inflow between the two reactors, in a vat connecting them fluidically, as explained above referring to the method.

Advantageously, the gasifier comprises a pumping unit designed for withdrawing a secondary flow rate of oxidizing aeriform fluid from one of the two reactors, at the area where the biomass dries or above this area, and for feeding it to the other reactor, at the area where the biomass dries, or above it. Furthermore, the pumping unit is designed for reversing alternately the flow of the secondary flow rate of oxidizing aeriform fluid between the reactors during time, in order to aid the gasification in both of them according to the above described advantages referring to the method. This allows the steps c) and d) of the method to be implemented.

The first and the second reactor can be part of the same vat, separated by bulkheads substantially flat and parallel to the axis of the vat itself, or the first and the second reactor can be constituted by concentric vats.

Alternatively, the gasifier is structured with a duct connecting the reactors at the respective area where biomass dries. In the duct there is a substantially sealed plunger or diaphragm, biased to reciprocating translation in order to alternately translate a volume of oxidizing aeriform fluid in the two reactors, back and forth, and to force a corresponding flow to cross the fixed bed in both ways, in each reactor.

Still another alternative provides that each reactor is equipped with a bellows-like portion. Convenient activating means compress and expand the bellows, alternatively, in order to compress a volume of oxidizing aeriform fluid in a reactor and to expand a corresponding volume of oxidizing aeriform fluid in the other reactor, with a time alternation. Also in this case the above mentioned bellows effect is obtained, imposing a "back and forth" motion through the bed.

Preferably, the gasifier further comprises at least one burner; the first and the second reactors are connected to a vat in which the burner generates a flame putting additional oxidizing aeriform fluids. This is an arrangement usable also to feed the primary flow rate of air between the two reactors, in addition or alternatively to direct inflows into the two reactors.

The gasifier can be realized in at least two variations.

In a first variation the first and the second reactors are vertical vats and the biomass is fed from the top in each reactor and crosses, in succession, a drying area, an area in which the biomass undergoes a pyrolysis process and an area in which the biomass undergoes the gasification process.

The bed formed by the biomass is supported by a grate and the produced ashes fall by gravity into the vat through the grates.

In a second variation the first and the second reactors are vertical vats and the biomass is fed from the bottom in each reactor and crosses, in succession, a drying area, an area in which the biomass undergoes a pyrolysis process and an area in which the biomass undergoes the gasification. The bed formed by the biomass is supported by a grate and the ashes produced by the bed stack on the upper part of the bed itself, from where convenient means remove them—for example augers.

The gasifier comprises one or more ducts extracting syngas from reactors, also at different heights.

In the just described two variations, the inflow of primary flow rate of oxidizing aeriform fluid can happen co-current with the biomass, for example in the upper part of the reactors (and this is the preferred embodiment), or counter-current with respect to the biomass, for example from the lower part of the reactors, or in an intermediate position between the two reactors, in a connecting vat.

The oxidizing aeriform fluid can be put directly with an injecting duct, or through a mass made of porous material.

For example, in a variation at least two containers are provided as openings in the connecting vat of the reactors. The containers are loaded with inert and porous material, for example a mass of sintered or separated pellets. The containers are fed with air and a suction line of syngas departs from them. By feeding air to one of the containers and suctioning syngas from the other one, alternately, what follows is obtained: the air crosses the porous material of a container and mixes to syngas present in the connecting vat; the high temperature, of about 800° C., is sufficient to light a flame at the container fed with air, approximately under one of the reactors. Therefore, with the flame also other oxidizing aeriform fluid is introduced. Through the other container syngas is suctioned from the connecting vat. The feed alternation of containers can be synchronized with steps c)-d) or e)-f) to optimize the syngas withdrawal from the gasifier.

In an embodiment, the reactors are vats whose inner diameter allows the insertion of hay or straw bales or other herbaceous stalks, for example round bales or Heston bales. The bales have standard size and, therefore, it is sufficient to realize vats having an inner diameter greater than the diameter or length of a standard bale.

The gasifier can be realized as pressurized, in order to minimize bulks and to provide syngas at a pressure compatible with the feed of the combustion chamber of a turbine. In this case, the biomass feed takes place by specific feeding means for each vat/reactor, for example by means of a rotating valve or a biconical feeder.

In its third aspect the invention concerns a plant for the production of electric power in which the gas turbine unit activating the alternator, or the internal combustion engine, is fed by syngas produced by one or more gasifiers according to the present invention.

BRIEF DESCRIPTION OF THE DRAWINGS

Further details of the invention will be evident anyway from the following description course made with reference to the attached drawings, in which.

DETAILED DESCRIPTION OF THE INVENTION

Figure 1:
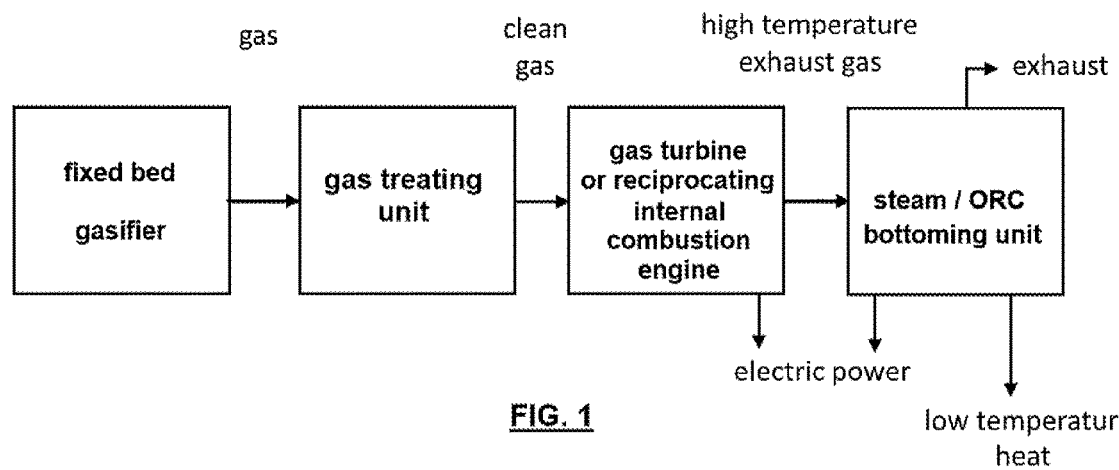
FIG. 1 is a scheme of a conventional combined cycle power plant using syngas produced by a gasifier.

FIG. 1 is a simplified scheme of a power plant with a gas turbine (or an internal combustion engine) using, for the combustion, the syngas produced by a conveniently-filtered fixed bed gasifier. The cycle is combined: waste heats of gas turbine are used to support a steam Rankine cycle or an Organic Rankine Cycle (ORC). Gas, clean gas, electric power, high-temperature waste gas and low-temperature heat are obtained in different steps.

The gasification method according the present invention will be explained referring to a gasifier that allows this method to be implemented.

Figure 2:
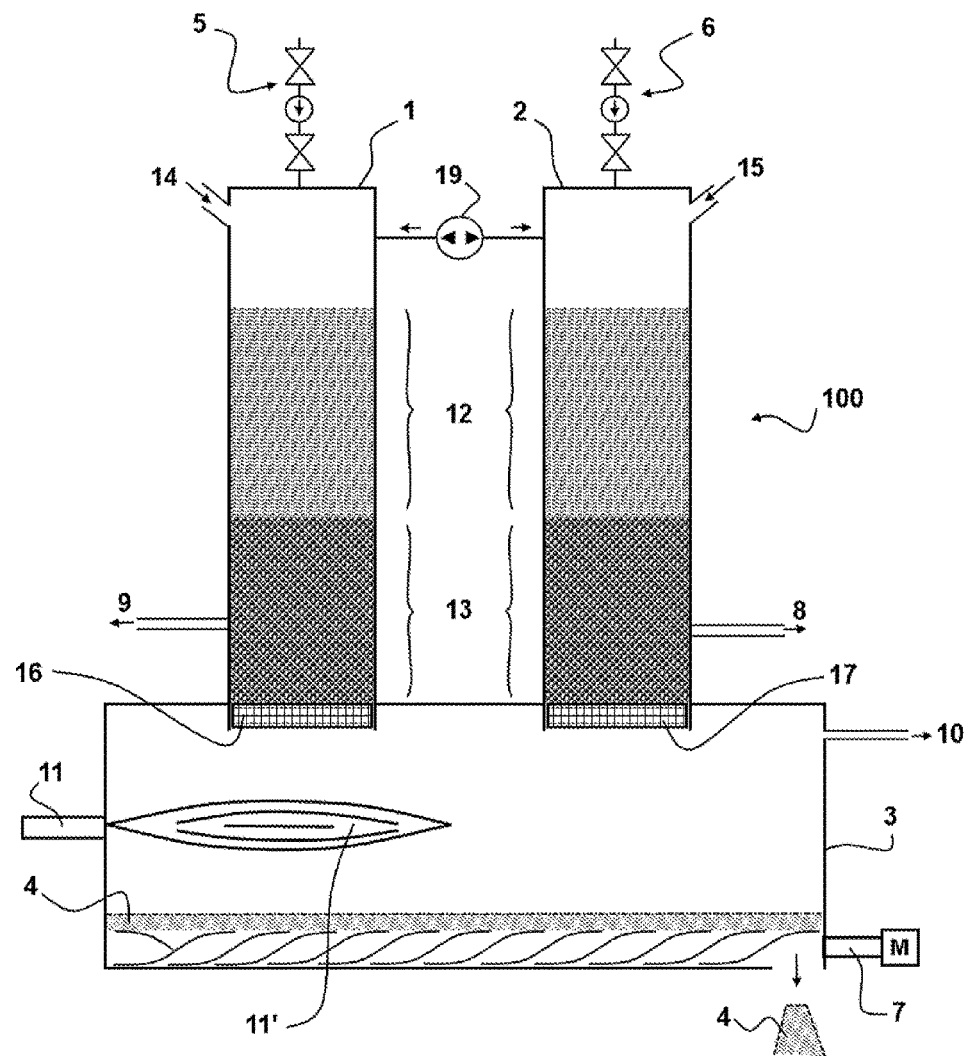
FIG. 2 is a schematic view of a first down-draft fixed bed gasifier according to the present invention.

FIG. 2 is a schematic view of a gasifier 100 according to the present invention comprising two vats 1 and 2 substantially placed with vertical axis, inside which the gasification reaction is provided and, therefore, which will be hereinafter called reactors. Reactors 1 and 2 preferably have the same volume and the same size.

The left reactor 1 is connected to an inflow line 5 of biomass, for example wood chips. Similarly, the right reactor 2 is fed by a corresponding line 6. The lines 5 and 6 for feeding chips, or another biomass with small sizes, are independent one from another and arranged to prevent the environment air from entering the reactors 1 and 2, i.e. they are airtight.

In reactors 1, 2 the air can be fed by corresponding feeding ducts 14 and 15 entering in the high part of the respective reactor. In this case, the moving direction of the air flow is the same of the moving direction of the biomass, as provided in gasifiers that are exactly called down-draft gasifiers.

At the respective base, the reactors air tightly enter a vat or chamber 3 connecting the two vats 1 and 2 and containing the ashes. In particular, at the base of the reactors 1 and 2, corresponding grates 16 and 17 supporting the fixed bed contained in the reactors themselves are provided. The grates 16 and 17 allow the fall of the ashes into the chamber 3.

The upper part of the reactors 1 and 2 is the "cold" part of the gasifier 100, whereas the chamber 3 is the "hot" part. The biomass fed by the lines 5 and 6 can have an initial moisture content usually up to 40% by mass and is processed along the respective reactor 1, 2 moving vertically from the cold part on top to the hot part on the bottom.

In the hot part of reactors 1 and 2, the biomass undergoes a drying step, and then it is moved downwards along the solid bed and is subjected to pyrolysis and gasification. The pyrolysis happens at the area of the fixed bed identified by numeral 12; in this area 12 the biomass, de facto, is transformed in char. In the area 13 of the fixed bed, comprised between the pyrolysis 12 and the grate 16 or 17 retaining the bed itself, the char reacts with the volatile substances generated by pyrolysis and the air fed by the feeding ducts 14 and 15, if used, and with the gas alternately fed from the duct 3; the reaction produces the syngas. The extracting ducts 8 and 9 open preferably at the gasification area 13 of each reactor 1 and 2.

The syngas is withdrawn directly from the extracting ducts 8 and 9 and/or from the exhaust 10 of the chamber 3 for uses known to the field technician. In the scheme shown in FIG. 2, the extracting ducts 8 and 9 have the same height, but generally they can be placed at different heights along the extent of reactors 1 and 2.

The gas extraction can be alternated in ducts 8 and 9 synchronously with respect to the alternated flow the gas in reactors 1, 2 is forced to, preferably with the criterion of extraction from the duct 8 when the flow proceeds from the first reactor 1 to the second reactor 2 and vice versa from the duct 9 when the flow proceeds in opposite way.

The purpose of the synchronous extraction is to extract the gas in time intervals in which it is cleaner and has a higher calorific value, since it crossed a greater char thickness.

The ashes 4, generated in the fixed bed, fall by gravity in the vat 3, from which they are extracted by convenient means 7, for example an auger conveyor operated by an electric motor.

The gas temperature inside the chamber 3 is maintained more or less constant, in the range of about 400° C.-900° C.—this range is adapted to sustain the gasification—through a burner 11 generating a flame 11' in the chamber 3, by introducing the correct amount of oxidizing aeriform fluid, for example air, oxygen, $CO_2$, water vapor, etc.

The flame 11' can be used with the ducts 14 and 15 to contemporaneously feed the oxidizing aeriform fluid to reactors 1 and 2, or alternatively, meaning that the primary flow rate of oxidizing aeriform fluid can be fed by ducts 14 and 15 or into the chamber 3.

Advantageously, the gasifier 100 comprises also a fan 19 connected to both reactors 1 and 2 to feed alternately the flow of aeriform fluid that activates the gasification.

The fan 19 is arranged to alternately withdraw and put an aeriform fluid from/into the two reactors 1 and 2. In other terms, the fan 19 operates in such a way that, for a given time lapse, it sucks the aeriform fluid from the left reactor 1 and put it into the right reactor 2 and, subsequently for another time lapse, it carries out the opposite operation, i.e. it withdraws the aeriform fluid from the right reactor 2 and put it into the left reactor 1. This cycle is repeated continuously.

Since the pressure drops through the fixed bed of each reactor 1 and 2 are low compared with the mean pressure of the air, the aeriform fluid withdrawn and put from/into each reactor 1, 2 by the fan 19 behaves, with a good approximation, as an incompressible fluid. For illustration purpose only, if the gasifier 100 is not pressurized, the mean pressure of the system is about 1 bar and the pressure drops through the fixed bed of each reactor 1, 2 are about 100-1000 mm of water column.

The alternation of the air flow forced by the fan 19 creates a "bellows" effect, that is a "back and forth" effect of the oxidizing flow, which aids the char gasification. The result is that, compared with a conventional down-draft fixed bed gasifier, in each reactor 1 and 2 the high-temperature zone 13 is higher and the zone 12 becomes lower; the tar is translated downwards and decomposed, and the produced syngas is cleaner.

Practically, the fan 19 creates a substantially alternating air flow (oxidizing aeriform fluid) that stimulates the gasification. In the fixed bed of each reactor 1, 2, the flow of oxidizing aeriform fluid is more turbulent than what can be ascertained in a conventional gasifier, other conditions unchanged, and the greater turbulence aids the gasification reactions between the bed and the gas crossing it.

The inversion frequency of the flows sucked and fed by the fan 19 to reactors 1 and 2 is comprised between 0.01 Hz and 10 Hz. The air flow processed by the fan 19 overlaps the air flows put into the reactors 1 and 2 through the ducts 14 and 15, if present. Obviously, the resulting mean motion is anyway downwards, i.e. towards the chamber 3, since the secondary flow rate of aeriform fluid fed by the fan 19 is not able to stop the air flow the feeding duct 14 or 15 puts in.

Figure 2A:
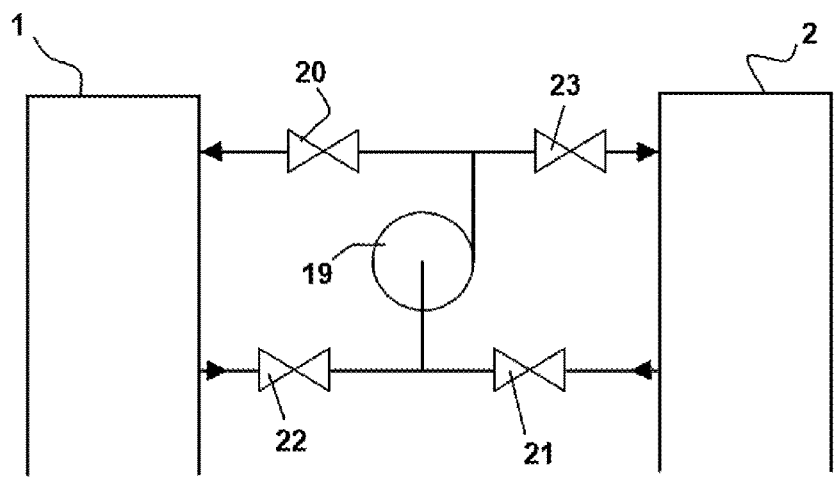
FIG. 2A is a schematic view of a gasifier detail according to the present invention.

It has to be noticed that the fan 19 in FIG. 2 is only a scheme. FIG. 2A shows a possible practical embodiment whose operation is described below. When the valves 22 and 23 are close, the fan 19 sucks aeriform fluid counter-current from the right reactor 2, and it puts it co-current into the left reactor 1. When expected, the valves 20 and 21 close and the valves 22 and 23 open: the fan 19 sucks aeriform fluid counter-current from the left reactor 1, and it puts it co-current into the right reactor 2. In the meanwhile, the feeding ducts 14 and 15 are still operating independently from the operation of the fan 19.

When the fan 19 draws aeriform fluid towards the upper part of the reactor 1 or 2, a portion of the high-temperature gas being in the bottom end of the reactor 1 or 2 is drawn too in the corresponding area 13 and aids the char gasification. That's why the area 13 becomes wider and the area 12 becomes smaller with respect to conventional gasifiers of the same type.

Figure 3:
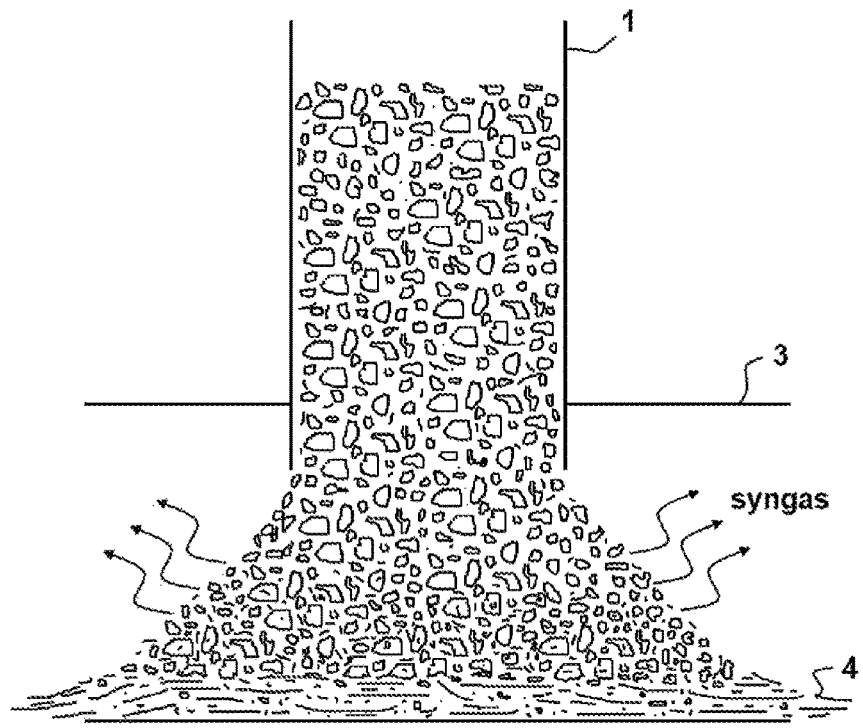
FIG. 3 is a schematic view of a detail of a gasifier variation according to the present invention.

FIG. 3 shows schematically and in detail a constructive variation having no grates 16, 17 supporting the fixed bed. In this variation, the char stack in the vat 3 with its own pile angle and makes a column extending in the corresponding reactor 1, 2. The bed weight is supported by the same char column. Anyway the syngas comes out from the char column.

The gasifier 100 can be pressurized by using known techniques. This solution is useful to minimize bulks of the gasifier 100 and to produce syngas at a pressure compatible with the direct use of the gas turbine, typically 10 absolute bars.

The reactors can be connected to ducts feeding water vapor in order to affect the gasification process and obtain a syngas rich in hydrogen $H_2$ and carbon monoxide CO compared with the inert fraction of nitrogen $N_2$.

Furthermore part of the sensible heat, present in the gas produced by the gasifier and come out from the gasification reaction, can be used to pre-heat the oxidizing aeriform fluid introduced by the burner 11 as a flamed gas.

Figure 4:
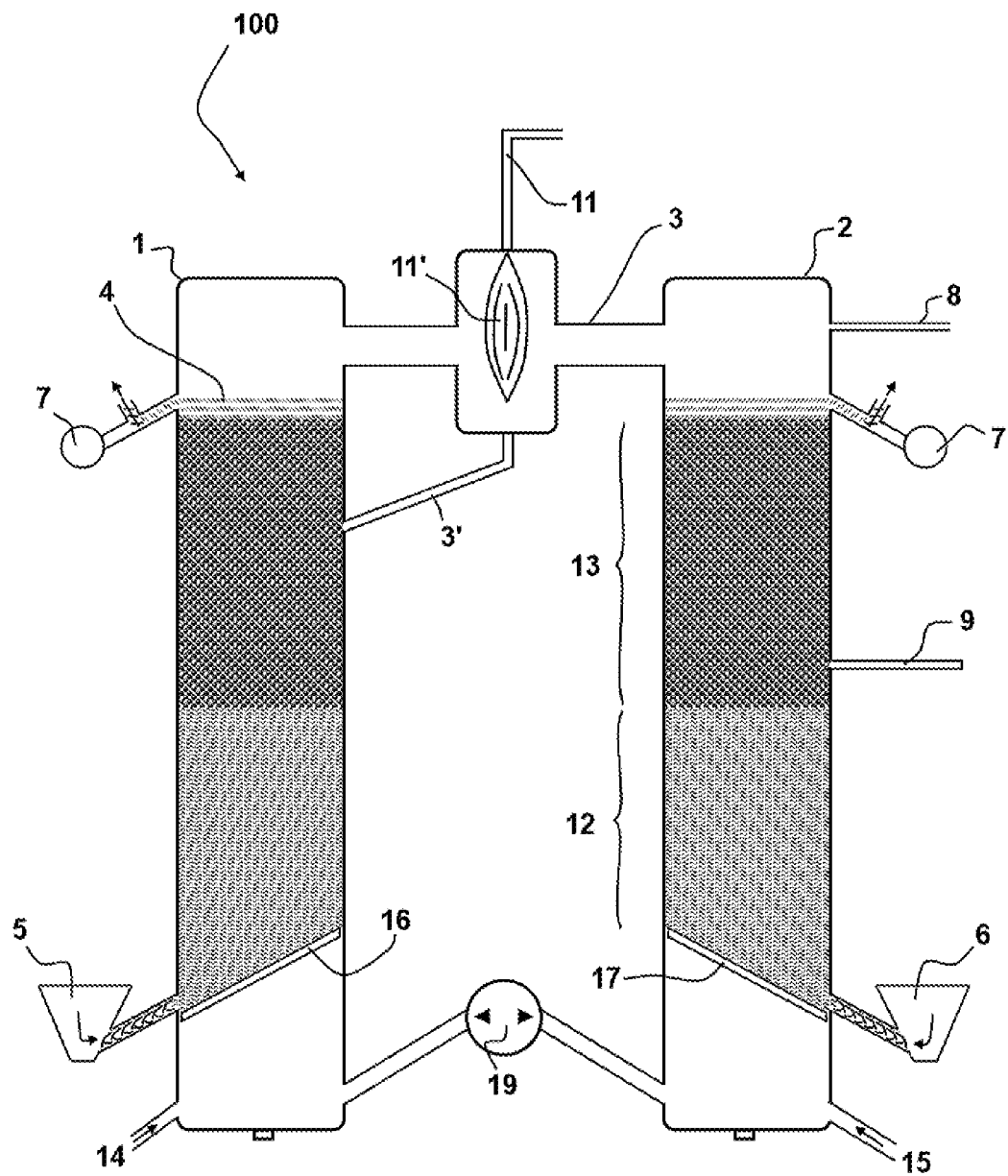
FIG. 4 is a schematic view of a second down-draft fixed bed gasifier according to the present invention.

FIG. 4 is a schematic view of another variation of the gasifier 100, different from the first one since the cold part of the gasifier is the lower part at the bottom of the reactors 1 and 2, and the hot part is the upper part. The biomass is fed through the grates 16 and 17 by convenient means, for example augers 5 and 6. The air, which is possibly fed through the ducts 14 and 15, crosses the grates 16 and 17 for moving towards the fixed bed. Therefore air and biomass move co-current from the bottom upwards.

In this embodiment the chamber 3 is positioned between the reactors 1 and 2 and the burner 11 injects a flame 11' therein. A duct 3' can be arranged so that the chamber 3 can be in communication with one of the reactors 1, 2, with the purpose of draining possible liquid fractions. The syngas is extracted from the ducts 8 and 9. The ash 4 forms above the fixed bed and is extracted by convenient means 7, for example augers, from reactors.

In this embodiment too it can be pressurized, as explained above.

If the gasifier 100 is pressurized, the respective feeding system have to be designed to define a feeding chamber of biomass that is sealed, in order to prevent vat depressurization and the gas in the gasifier from leaking.

Figure 12:
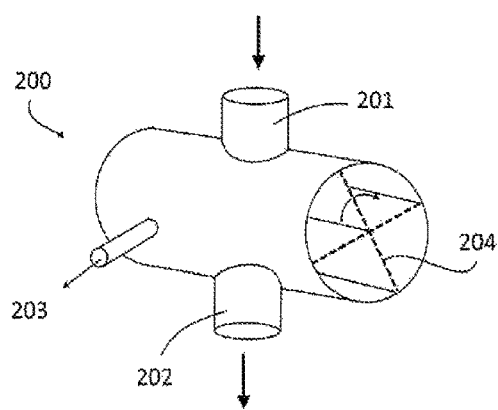
FIG. 12 is a schematic view of a component of a pressurized gasifier, according to the present invention.

FIG. 12 is a schematic view of a rotating-valve feeder 200 that can be used to feed biomass to the gasifier 100. The valve comprises an inlet 201, an outlet 202 of the biomass in the pressurized vats, a vent 203 for removing the fuel gas flowing back in the valve during rotation, and an inner impeller 204 displacing the biomass towards the outlet 202, at the same time assuring the seal against the inner walls of the valve.

Figure 13:
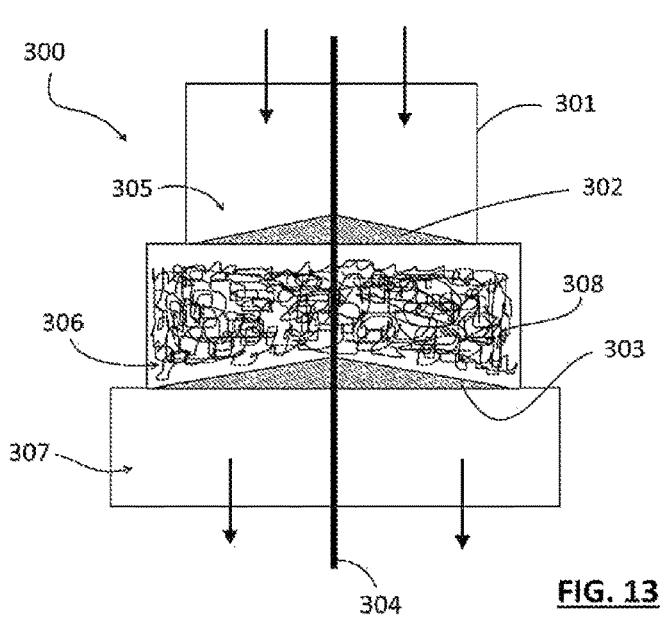
FIG. 13 is a schematic view of a component of a pressurized gasifier, according to the present invention.

Alternatively, for example, also a biconical feeder 300 can be used, as that shown in FIG. 13. Two cone-shaped dosing units 302 and 303 are arranged inside a container 301, which can be moved independently along the shaft 304. The cones 302, 303 define three chambers 305-307 in the container 301. When the biomass 308 is inserted from above in the container 301, on the first cone 302, the latter is lowered to allow the second chamber 306 to be filled (as shown in FIG. 13). The first cone 302 is closed again and, at this point, the second cone 303 is lowered so that the biomass 308 can fall towards the corresponding pressurized vat. In practice, the chamber 307 has still the pressure of the corresponding vat, the chamber 305 has the environment pressure and the chamber 306 is pressurized on case-by-case basis, preferably through an auxiliary duct, when the cone 303 is lowered and opened.

Figure 14:
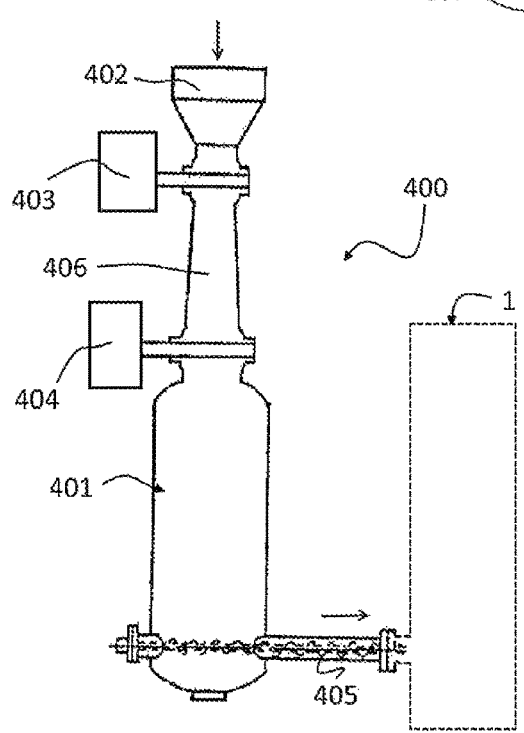
FIG. 14 is a schematic view of a component of a pressurized gasifier, according to the present invention.

Still alternatively, a feeder 400 of the type shown in FIG. 14 can be used, comprising a loading hopper 402, a container for the biomass 401 and two gate valves 403 and 404, and a worm 405 for feeding the biomass to the respective reactor 1. The valves 403, 404 are controlled for their opening and closing, alternately, with no pressurization of the container 401.

The gasifier 100 according to the present invention can be used in a plant designed for the production of electric power.

Figure 5:
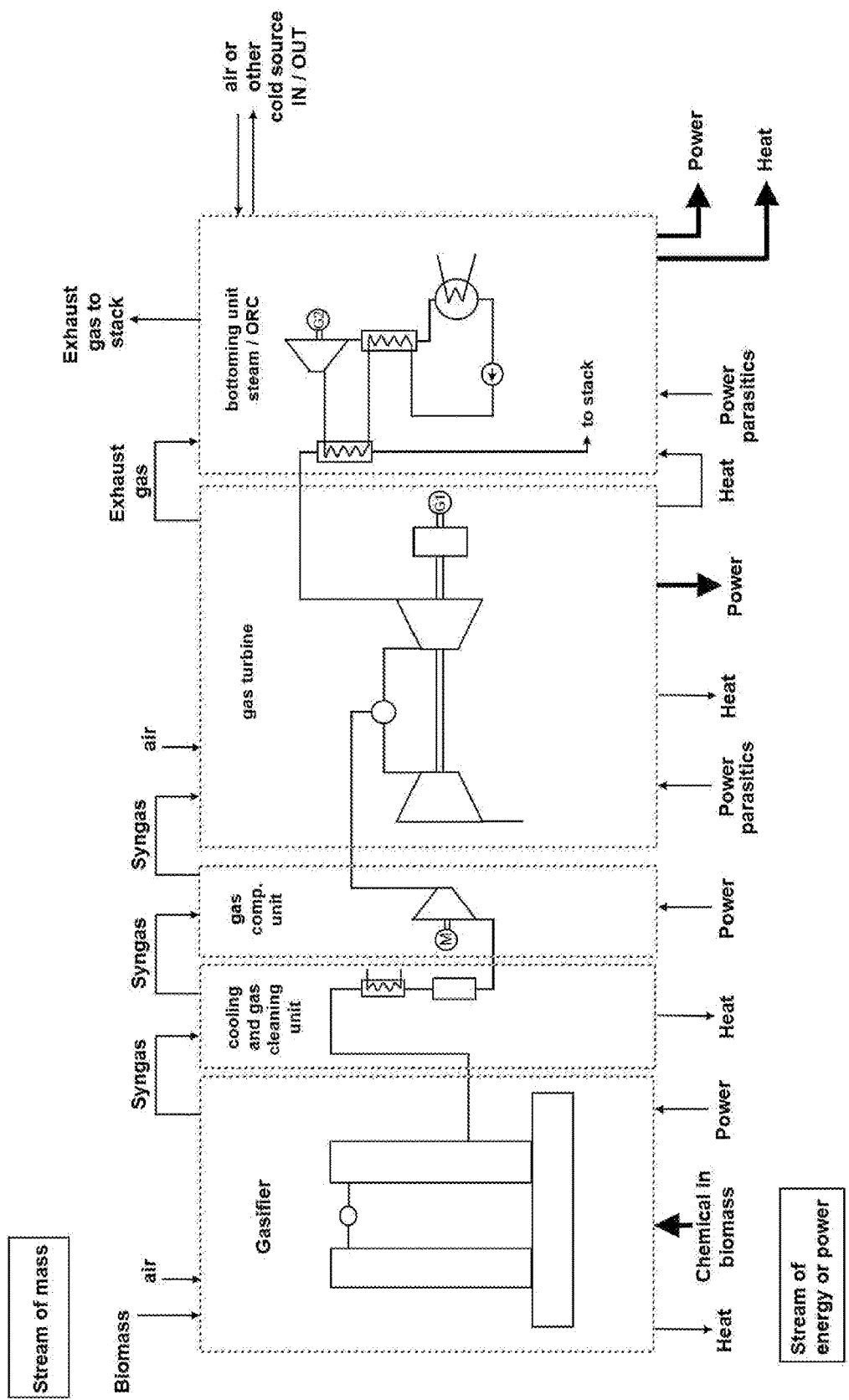
FIG. 5 is a scheme of heat-and-power plant provided with a gasifier according to the present invention.

FIG. 5 is a schematic view of a possible use. It is a combined cycle power plant.

In the upper part of the scheme the mass flow is shown, and in the lower part the energy or power flows are shown.

From the mass point of view, the gasifier 100 is fed with biomass and air and produces syngas, the latter is fed to a treating unit for the respective cooling and the particulate abatement. From the energy point of view, the gasifier needs power and chemical energy from the biomass and produces heat.

The cooling unit, which abates the particulate, processes the syngas and feeds it, clean and cooled, to a compressing unit. The cooling and particulate abatement unit needs a cooling source and mechanical/electrical power, for its operation.

The compressing unit needs power and increases the syngas pressure up to values compatible for the feeding to combustor of a gas turbine powered group.

On its part, the gas turbine group uses the syngas as a fuel and needs air as a combustive agent. The turbogas group activates an electric generator G1, for example an alternator, producing electric power. The group absorbs parasitic power for its own auxiliary systems. A part of the heat produced by the turbogas disperses and a part is used to supply a bottoming thermodynamic cycle, for example a steam cycle or an organic Rankine cycle (ORC). Typically, the waste gases of turbogas are used in a heat exchanger to generate vapor of water or organic fluid of the bottoming cycle. The thermal flows dispersed by the gasifier and/or the treating system can be, in their turn, conveniently used in the bottoming unit.

A reciprocating internal combustion engine (ICE) can be used in substitution of the turbogas group.

The water vapor or ORC bottoming unit produces electricity by means of a second electric generator G2 activated by a turbine of the bottoming cycle. Therefore, heat and electric power are still produced.

Figure 6:
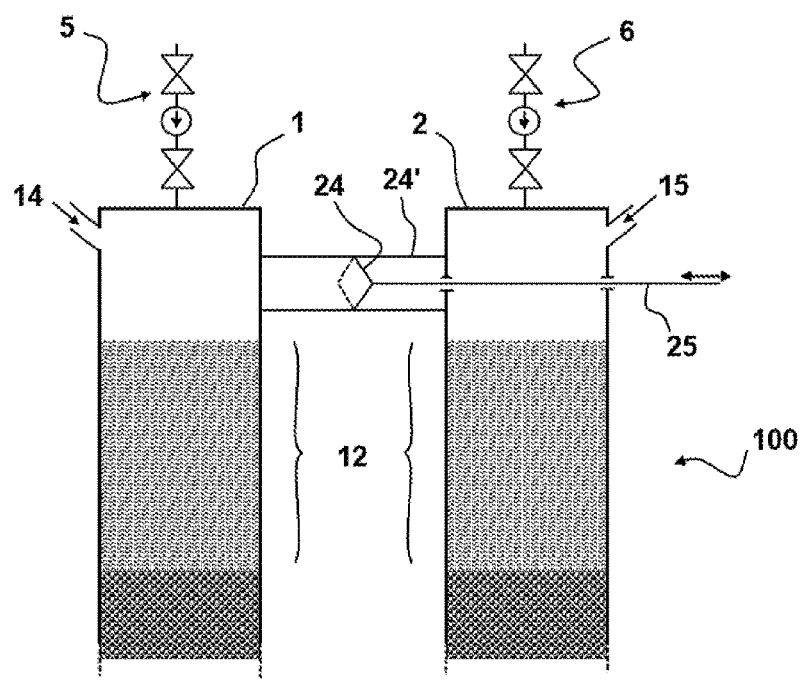
FIG. 6 is a partial schematic view of a variation of a down-draft fixed bed gasifier according to the present invention.

FIG. 6 shows schematically and partially a gasifier 100 according to the present invention, different from the version shown in FIG. 2 in that the fan 19 is replaced by a diaphragm 24 operated by a stem 25 reciprocating in the two ways along its own axis, with the above described frequency and as indicated by the arrow. The diaphragm 24, by moving in the duct 24', creates the mentioned "bellows" effect in reactors 1 and 2 ("back and forth" flow). Obviously, the stem 25 is sealingly supported by bearings and gaskets, through the reactor 2. In this solution, the secondary flow rate of oxidizing aeriform fluid does not move from one reactor to the other, since the diaphragm 24 at most sucks and compresses the air from the same reactor 1 or 2. However, the created effect is substantially equivalent to what described above referring to the fan 19.

Figure 7:
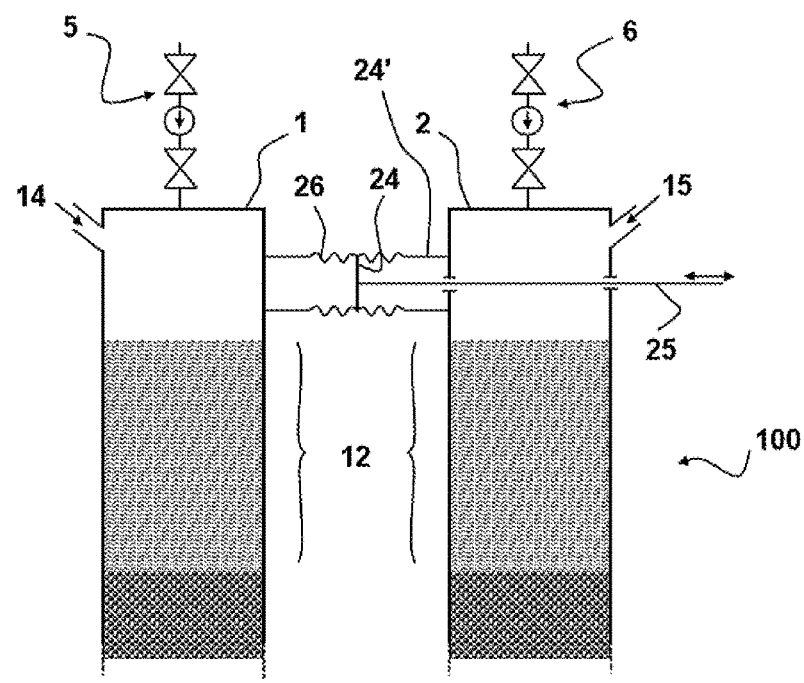
FIG. 7 is a partial schematic view of another variation of a down-draft fixed bed gasifier according to the present invention.

In FIG. 7 another alternative is schematically shown. In this variation, a diaphragm 24 is alternately pushed back and forth in the duct 24' by a stem 25. The duct 24' is provided with a bellows-like portion 26 fixed to the diaphragm 24, whereby the movement of the stem 25 causes the localized compression and expansion of the bellows-like portion 26, alternately in the two ways, to feed the secondary air flow rate to the reactors 1 and 2, selectively. Also in this case, the secondary air flow rate is not exchanged between the two reactors: to each reactor 1, 2 corresponds a secondary air flow rate corresponding to the volume moved by the diaphragm 24.

Figure 8:
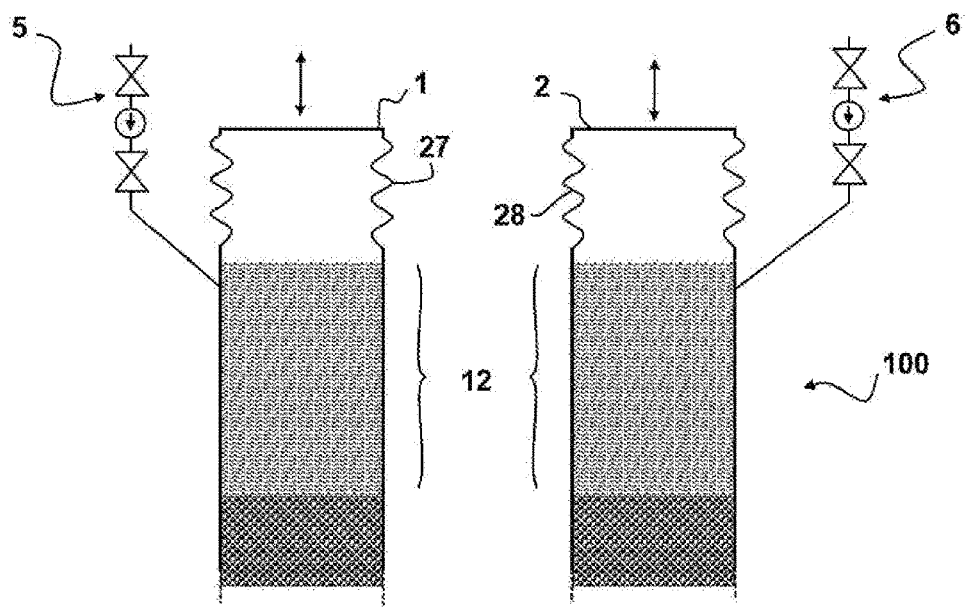
FIG. 8 is a partial schematic view of another variation of a down-draft fixed bed gasifier according to the present invention.

In FIG. 8 still another variation is shown. In this embodiment, the fan 19 is absent and in place of it, the design provides for equipping each reactor 1, 2 with an upper bellows-like portion, respectively 27, 28. The two bellows-like portions 27 and 28 are alternately activated, one in compression and the other one in expansion, to create the bellows effect and pulse a corresponding secondary air flow rate to the respective reactor 1, 2.

Figure 9:
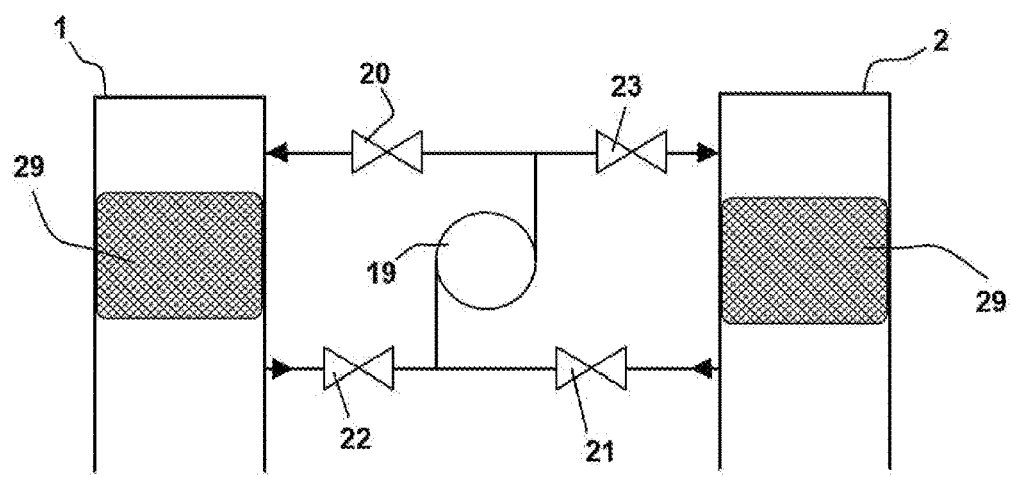
FIG. 9 is a partial schematic view of another variation of a down-draft fixed bed gasifier according to the present invention.

FIG. 9 shows a variation of the gasifier 100 designed to be fed with straw bales 29, for example standard round bales of the Heston type, etc., directly inserted into the reactors 1 and 2. Therefore, the inner diameter of reactors 1 and 2 is specifically selected to allow the straw bales 29 to be inserted easily. For example, this can happen by means of a pre-chamber provided in each reactor, which has access and load walls of the gate type. This solution can be applied to all embodiments of the gasifier 100 shown in the preceding figures.

Figure 10:
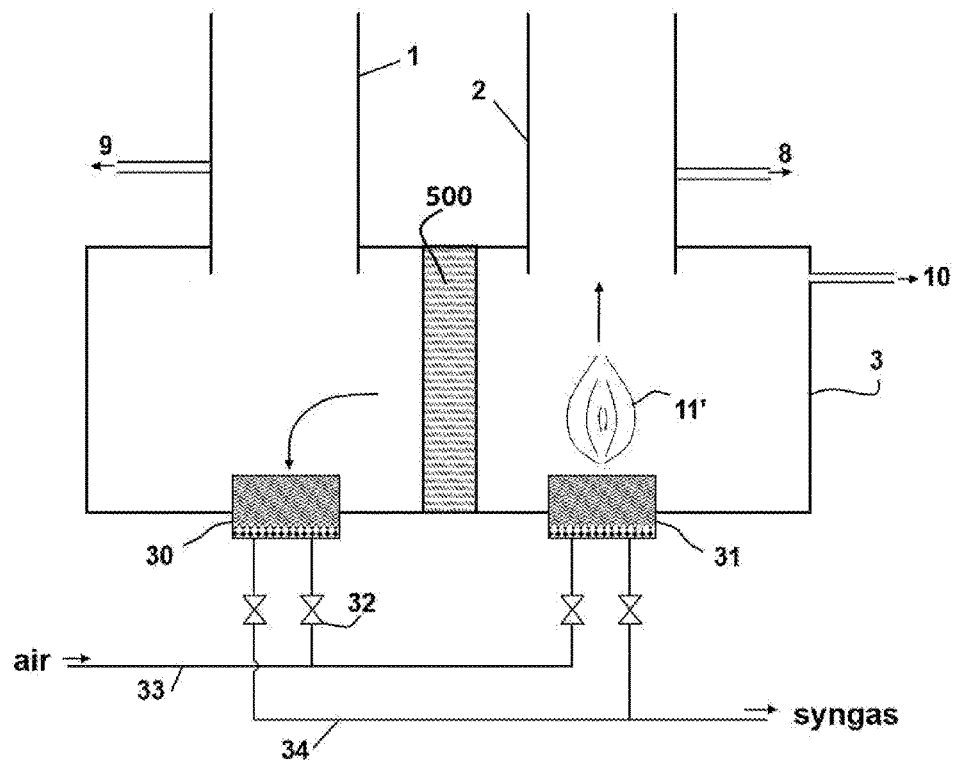
FIG. 10 is a partial schematic view of another variation of a gasifier according to the present invention.

FIG. 10 shows schematically a variation of the gasifier 100 in which, in the connecting chamber 3, the burner 11 is not provided. In the chamber two vessels 30 and 31 are prearranged and filled with a porous mass, for example ceramic balls sintered one to another, or separated balls. A flame 11' in the connecting chamber 3 can be ignited, alternately from the vessel 30 or the vessel 31, through a line 33 feeding air (oxidizing aeriform fluid), valves 32 and a delivery line 34 of syngas. With the numeral 500 a porous membrane made of a catalytic material is shown, for example a cartridge obtained from a pellet material. A usable material is the dolomite mineral, constituted by calcium magnesium carbonate. However, some synthetic materials are preferred because of their better performances. For example, US 2003/0115800 describes some adapted materials, as $Rh/CeO_2/M$, where M is selected from $SiO_2$, $Al_2O_3$ or $ZrO_2$.

The operation can be described in these terms. The temperature inside the connecting chamber 3 is about 800° C.; by operating the opening and closing of the valves 32, the air is alternately fed to the vessel 30 or to the vessel 31. In FIG. 10 the case in which the vessel 31 is fed with air is shown. The air crosses the porous mass and, by mixing with the syngas, creates a fuel-comburent mixture that goes up in flames. The flame 11' acts as an air carrier for the reactor 2. At the same time, by the line 34 syngas is withdrawn through the vessel 30. And still contemporaneously, the secondary air flow rate is withdrawn from the reactor 2 and put into the reactor 1.

Subsequently, the valve 32 feeding air to the vessel 31 is closed; in fact, the air is fed to the vessel 30 to generate a flame under the reactor 1. The syngas is withdrawn through the vessel 31 and the secondary air flow rate is withdrawn from the reactor 1 and put into the reactor 2.

Therefore, the activation of the valves 32 is synchronized with the fan 19 or the piston 24 or with the activation of the bellows 27 and 28, etc. The pyrolysis of the biomass and the syngas composition are improved by this solution.

Figure 11:
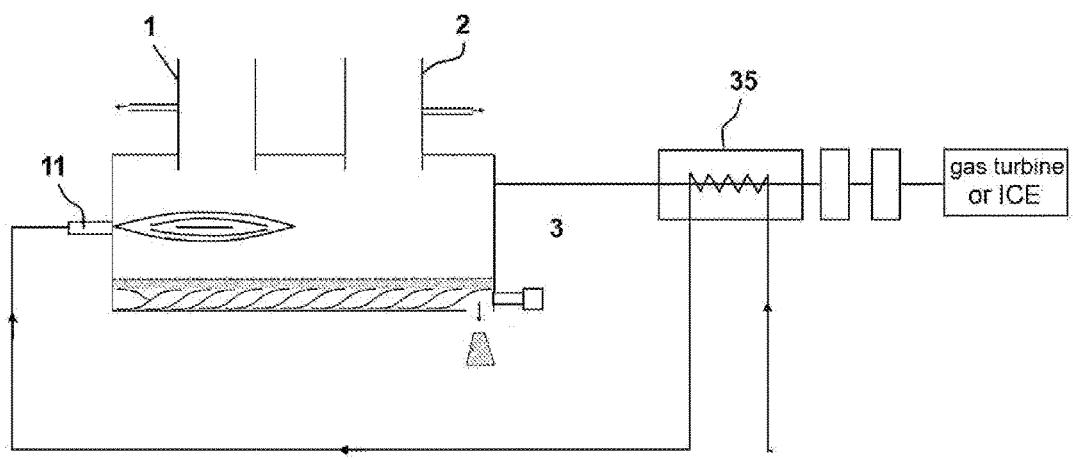
FIG. 11 is a partial schematic view of another variation of a gasifier according to the present invention.

FIG. 11 shows a variation in which the air fed to the burner 11 is pre-heated in an exchanger 35. Part of the syngas heat coming out from the gasifier 100 is transferred to the air, the latter is later fed to the burner 11.

The invention claimed is:

1. A method for producing syngas from preferably vegetal biomass, comprising the steps of:
   a) prearranging a gasifier (100) provided with at least one first reactor (1) and at least one second reactor (2),
   b) feeding, in each reactor (1, 2), biomass and a primary flow rate of oxidizing aeriform fluid, to the extent of obtaining a fixed bed of drying biomass, biomass (12) subjected to pyrolysis and biomass char (13), that release the syngas,
   wherein the primary flow rate of oxidizing aeriform fluid is fed co-current or counter-current to the reactors (1, 2) with respect to the biomass, and/or is fed into a chamber (3) connecting the reactors (1, 2),
   and wherein the steps alternated in time, which promote the char (13) gasification, of:
   e) increasing the volume of the first reactor (1) to expand a volume of oxidizing aeriform fluid at the area where the biomass dries and, at the same time, decreasing the volume of the second reactor (2) to compress a corresponding volume of oxidizing aeriform fluid at the area where the biomass dries, and
   f) increasing the volume of the second reactor (2) to expand a volume of oxidizing aeriform fluid at the area where the biomass dries and, at the same time, decreasing the volume of the first reactor (2) to compress a corresponding volume of oxidizing aeriform fluid at the area where the biomass dries.

2. The method according to claim 1, wherein steps e) and f) are subsequent over time, or there is a pause between them, and they are alternated with a frequency comprised between 0.01 Hz and 10 Hz while step b) is carried out.

3. The method according to claim, wherein steps e) and f) are carried out by bellows (27, 28) each of which is constrained to a reactor (1, 2) and alternately operated in compression or expansion, or by at least one substantially sealed plunger or diaphragm (24) alternately drawn in the two ways along a duct (24") connecting the reactors (1, 2), at the height of the area where the biomass dries.

4. The method according to claim 1, wherein the oxidizing aeriform fluid is: air, water vapor, oxygen, carbon monoxide, carbon dioxide, or a mixture of two or more thereof, and the volume of oxidizing aeriform fluid expanded/compressed in steps e) and f), passes through the fixed bed in the first and second reactors, aiding the drying of the biomass put into the reactors (1, 2), and respective pyrolysis and gasification.

5. The method according to claim 1, wherein:
   the biomass is fed into the reactors (1, 2) from top downwards, and the primary flow rate of oxidizing aeriform fluid is fed co-current or counter-current with respect to the biomass, directly into the reactors (1, 2) or else
   the biomass is fed into the reactors (1, 2) from the bottom upwards, and the primary flow rate of oxidizing aeriform fluid is fed co-current or counter-current with respect to the biomass, directly into the reactors (1, 2), and
   as an alternative or in addition, the primary flow rate of oxidizing aeriform fluid is fed into said connecting chamber (3).

6. The method according to claim 5, wherein at least part of the primary flow rate of oxidizing aeriform fluid is fed into the connecting chamber (3) by:
   a burner (11) putting a flame (11') into the connecting chamber (3), or
   an inflow line (33) feeding alternately a first container (30) and a second container (31) which open into the connecting chamber (3), wherein the containers (30, 31) are filled with a mass of porous material in which the fed oxidizing aeriform fluid and the syngas suctioned from the connecting chamber (3) pass through alternately, and wherein the feed of the oxidizing aeriform fluid to one of the containers (30, 31) causes the ignition of a flame (11').

7. The method according to claim 1, wherein the reactors are more than two, connected in series and/or in parallel with regard to suction and feeding of the secondary flow rate of oxidizing aeriform fluid or expansion and compression of the volume of oxidizing aeriform fluid.

8. The method according to claim 1, wherein an average of the absolute value of the secondary flow rate of oxidizing aeriform fluid is equal to a percentage of the primary flow rate of oxidizing aeriform fluid, still in absolute value, comprised between 10% and 300% by mass and wherein a volume of compressed/expanded oxidizing aeriform fluid is equal to about 10% of a volume of a reactor (1, 2).

9. A fixed bed gasifier (100), comprising a first reactor (1) and a second reactor (2), a connecting chamber (3) connecting the reactors (1, 2), a feed mechanism (5, 6) to feed vegetal biomass into both reactors (1, 2), wherein in each reactor (1, 2) the biomass is subjected to drying, pyrolysis and gasification, and a feed device (14, 15) of a primary flow rate of oxidizing aeriform fluid into each reactor (1, 2), wherein said primary flow rate is fed into the reactors (1, 2) co-current or counter-current with respect to the biomass and/or is fed to the connecting chamber (3), wherein the gasifier further comprises one from among:
- a duct (24'), connecting the reactors (1, 2) at the vegetal biomass drying areas, in which a piston (24) is provided which translates in two ways alternately, back and forth as a plunger, expanding a volume of oxidizing aeriform fluid in one of the reactors (1, 2) and compressing a corresponding volume of oxidizing aeriform fluid in the other reactor (2, 1), or
- a first bellows (27) connected to the first reactor (1) at the vegetal biomass drying area and a second bellows (28) connected to the second reactor (2) at the vegetal biomass drying area,
- wherein the first bellows expand a volume of oxidizing aeriform fluid in one of the reactors, at the same time the second bellows compress a corresponding volume of oxidizing aeriform fluid in the other reactor, alternatingly,
for aiding the gasification in the reactors (1, 2).

10. The gasifier (100) according to claim 9, wherein the feed device (14, 15) of the primary flow rate of oxidizing aeriform fluid comprises at least two ducts each connecting to one of the reactors (1, 2) and, in addition or as an alternative, the first (1) and the second (2) reactors are connected to a chamber (3) and the feeding means comprise a burner (11) generating a flame (11') in the connecting chamber (3), thus feeding said primary flow rate of oxidizing aeriform fluid or a further flow rate of oxidizing aeriform fluid in addition to the primary one.

11. The gasifier (100) according to claim 9, wherein the feed device of the primary flow rate of oxidizing aeriform fluid comprises two containers (30, 31) communicating with the connecting chamber (3) and filled with porous material, an inflow line (33) of oxidizing aeriform fluid to the containers (30, 31), a suction line (34) of syngas from the containers (30, 31), shut-off valves (32) of said lines (33, 34) and a device to open and close the valves (32) in order to feed oxidizing aeriform fluid alternately to the two containers (30, 31) and to suction syngas alternately from the two containers (30, 31).

12. The gasifier (100) according to claim 10, wherein the first (1) and the second (2) reactors are vertical vats and:
- in each reactor (1, 2) the biomass is fed from the top and passes through, in succession, a drying area, an area (12) in which the biomass undergoes a pyrolysis process and an area (13) in which the biomass undergoes a gasification process, and wherein the bed, composed of the biomass of said areas (12, 13), is supported by a grate (16, 17) and the ashes, produced by the bed, fall by gravity into the vat (3) through the grate (16, 17), or alternately
- in each reactor (1, 2) the biomass is fed from the bottom and passes through, in succession, a drying area, an area (12) in which the biomass undergoes a pyrolysis process and an area (13) in which the biomass undergoes a gasification process, and wherein the bed, composed of the biomass of the afore said areas (12, 13), is supported by a grate (16, 17) and the ashes, produced by the bed, stack in the upper part of the bed itself.

13. The gasifier (100) according to claim 9, further comprising one or more extracting ducts (8, 9) of syngas produced in the reactors (1, 2) and an extractor (7) of the ashes, wherein the gas extraction is synchronously alternated in ducts (8, 9) with respect to the alternated flow the gas in reactors (1, 2) is forced to, with the criterion of extraction from the duct (8) of the first reactor (1) when the flow proceeds from the first reactor (1) to the second reactor (1) and vice versa.

14. The gasifier (100) according to claim 9, wherein the reactors (1, 2) are sized compatibly with standard round bales, to allow insertion, in each reactor, of biomass in a shape of hay or straw bales or other herbaceous stalks, as round bales or Heston bales.

15. The gasifier (100) according to claim 9, wherein the gasifier is pressurized to produce syngas at a pressure compatible with the direct use in a gas turbine.

16. The gasifier according to claim 15 comprising, for biomass feeding, a rotating-valve feeder (200), which is either a biconical feeder (300) or a feeder with a double gate valve (400).

17. A power plant comprising at least one gasifier (100) and at least one gas turbine unit or combustion engine and one alternator (G2), wherein the at least one gasifier (100) is a fixed bed type according to claim 8.

* * * * *

UNITED STATES PATENT AND TRADEMARK OFFICE
CERTIFICATE OF CORRECTION

| | |
|---|---|
| PATENT NO. | : 10,059,893 B2 |
| APPLICATION NO. | : 15/101652 |
| DATED | : August 28, 2018 |
| INVENTOR(S) | : Mario Gaia and Roberto Bini |

It is certified that error appears in the above-identified patent and that said Letters Patent is hereby corrected as shown below:

In the Claims

Column 14, Line 17 (the first line of Claim 3), insert the number --1-- after the word "claim," and before the ",".

Signed and Sealed this
Sixth Day of November, 2018

Andrei Iancu
*Director of the United States Patent and Trademark Office*